United States Patent
Li

(10) Patent No.: US 12,500,694 B2
(45) Date of Patent: Dec. 16, 2025

(54) PUNCTURED CONVOLUTIONAL CODES

(71) Applicant: Nordic Semiconductor ASA, Trondheim (NO)

(72) Inventor: Wei Li, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 28 days.

(21) Appl. No.: 18/422,965

(22) Filed: Jan. 25, 2024

(65) Prior Publication Data

US 2024/0259134 A1 Aug. 1, 2024

(30) Foreign Application Priority Data

Jan. 27, 2023 (GB) ...................................... 2301194
Jun. 7, 2023 (GB) ...................................... 2308490

(51) Int. Cl.
*H04L 1/00* (2006.01)

(52) U.S. Cl.
CPC .......... *H04L 1/0059* (2013.01); *H04L 1/0069* (2013.01)

(58) Field of Classification Search
CPC ............. H03M 13/235; H03M 13/256; H03M 13/6362; H04L 1/0059; H04L 1/0069
See application file for complete search history.

(56) References Cited

U.S. PATENT DOCUMENTS

| | | | | |
|---|---|---|---|---|
| 5,511,082 A | * | 4/1996 | How .................... | H04L 1/0059 714/790 |
| 7,685,505 B2 | * | 3/2010 | Showmake ....... | H03M 13/6362 714/790 |
| 11,742,980 B2 | * | 8/2023 | Yunusov ............... | H04L 1/0013 370/329 |
| 2022/0337272 A1 | * | 10/2022 | Montorsi ............ | H03M 13/235 |

OTHER PUBLICATIONS

Bluetooth, "Low Energy Controller," *Specification of the Bluetooth® System*, vol. 6, Revision Date: Jul. 13, 2021, 422 pages.

(Continued)

*Primary Examiner* — Shelly A Chase
(74) *Attorney, Agent, or Firm* — Klarquist Sparkman, LLP

(57) ABSTRACT

A method of generating a puncturing pattern for use with a 1/n convolutional code having a predetermined code rate is disclosed. The 1/n convolutional code uses a predetermined set of binary generator polynomials comprising a first generator polynomial and a second generator polynomial, wherein the second generator polynomial has more non-zero coefficients than the first generator polynomial. For each of a plurality of candidate puncturing patterns, transmission of data over a noisy channel is simulated, the data being encoded using the 1/n convolutional code punctured in accordance with the respective puncturing pattern. A transmission error rate is determined for each candidate, and the error rates are compared to identify a candidate that has a lowest error rate. The plurality of candidate puncturing patterns includes only patterns that puncture no more coded (Continued)

bits generated by the second generator polynomial than they puncture coded bits generated by the first generator polynomial.

19 Claims, 3 Drawing Sheets

(56) References Cited

OTHER PUBLICATIONS

Eriksson et al., "Complexity Reduction of Blind Decoding Schemes Using CRC Splitting," *GLOBECOM 2012-2012 IEEE Global Communications Conference*, published 2012, IEEE, pp. 3731-3736.

IPO Combined Search and Examination Report under Sections 17 and 18(3) for Great Britain Application No. 2301194.3, dated Jul. 18, 2023, 6 pages.

Kim, "On Systematic Punctured Convolutional Codes," *IEEE Transactions on Communications*, vol. 45, No. 2, Feb. 1997, pp. 133-139.

Yasuda et al., "High Rate Punctured Convolutional Codes for Soft Decision Viterbi Decoding," *IEEE Transactions on Communications*, vol. COM-32, No. 3, Mar. 1984, pp. 315-319.

\* cited by examiner

PUNCTURED CONVOLUTIONAL CODES

CROSS REFERENCE TO RELATED APPLICATIONS

This application claims priority from Great Britain Application No. 2301194.3, filed Jan. 27, 2023, and Great Britain Application No. 2308490.8, filed Jun. 7, 2023, both of which are incorporated herein by reference in their entirety.

TECHNICAL FIELD

This invention relates to methods of generating punctured convolutional codes and to communication apparatus configured to use punctured convolutional codes.

BACKGROUND

Convolution coding is commonly used in digital communications for detecting and correcting errors in a received message caused by a noisy channel. Applying a convolution code typically involves passing a bit stream through a fixed-length shift register and applying binary arithmetic to various combinations of bit positions within the shift register in order to generate a longer stream of convolutionally-encoded output bits. This longer stream includes redundancy which enables error correction to be performed by a receiver. The binary arithmetic operations performed by the convolutional code may be expressed as a set or matrix of binary generator polynomials, the output bit streams of which are interleaved to generate the convolutionally-encoded bit stream. Systematic convolution codes include the original message data uncoded within their output, whereas non-systematic do not.

Convolutional codes are characterised by a code rate, k/n, and a constraint length, K. The code rate specifies the ratio of input bits to output bits, k:n, while the constraint length determines how many input bits influence each output bit. A receiver can detect and correct for errors in a stream where a received sequence does not correspond to a valid path through a time-invariant trellis, e.g. by using the Viterbi algorithm.

Punctured convolutional codes discard certain bits from the output stream of base convolutional code according to a predetermined puncturing pattern, thereby reducing the output bit rate. This can be a useful technique for enabling a given base convolutional code (e.g. a 1/2 or 1/3 convolutional code) to be used to generate convolutional encodings at various different code rates. These effective code rates may be higher than the base rate (i.e. closer to one), such as a rate of 7/8, derived from a base rate of 1/2. and configurable rates using a constant lower base rate. This can conveniently allow a standard 1/2 encoder or decoder to be used to generate configurable and/or higher punctured code rates.

However, identifying puncturing patterns that exhibit good error correcting performance is not straightforward, especially for longer pattern lengths.

Embodiments of the present invention seek to provide an efficient method for identifying puncturing patterns, as well as communication apparatus that uses certain novel high-performing puncturing patterns with particular convolutional codes.

SUMMARY OF THE INVENTION

From a first aspect, the invention provides a method of generating a puncturing pattern of a predetermined length for use with a 1/n convolutional code, for an integer n>1, for encoding data for transmission over a channel using a punctured convolutional code having a predetermined code rate, wherein the 1/n convolutional code uses a predetermined set of binary generator polynomials comprising a first generator polynomial and a second generator polynomial, wherein the second generator polynomial has more non-zero coefficients than the first generator polynomial, the method comprising selecting a puncturing pattern of a plurality of candidate puncturing patterns of the predetermined length by:

for each candidate puncturing pattern of the plurality of candidate puncturing patterns, simulating transmission of data encoded using the 1/n convolutional code punctured in accordance with the respective candidate puncturing pattern over a noisy channel, and determining a respective transmission error rate for the simulated transmission using the candidate puncturing pattern; and comparing the determined transmission error rates for the plurality of candidate puncturing patterns to identify a candidate puncturing pattern that has a lowest transmission error rate of all the plurality of candidate puncturing patterns, wherein the plurality of candidate puncturing patterns includes only candidate puncturing patterns that puncture no more coded bits generated by the second generator polynomial than they puncture coded bits generated by the first generator polynomial.

Thus it will be seen that, in accordance with embodiments of the invention, the simulating of data transmission and determining a transmission error rate is performed only for candidate puncturing patterns that puncture at least as many coded bits generated by the first generator polynomial as they puncture coded bits generated by the second generator polynomial. This approach may be understood as excluding from the simulation any puncturing pattern that applies more puncturing to bits that are generated by a polynomial of the set that captures more of the original message data in its output (and whose output can thus be considered as making a more valuable contribution to the encoded data), than it does to bits generated by another polynomial of the set that captures less of the original message data in its output (and whose output can thus be considered as less valuable).

This exclusion of patterns that are likely to discard more of the meaningful information content of the original message enables a more efficient search for a puncturing pattern that is likely to perform well, by significantly reducing the number of candidate patterns to be tested (e.g. compared with searching exhaustively over all puncturing patterns that are of the predetermined length and produce a punctured convolutional code of the predetermined code rate). Improving the efficiency of the process may be especially beneficial for longer puncturing patterns, where an exhaustive search would be computationally infeasible.

The method is beneficial for determining any length of puncturing pattern, but in some embodiments, the predetermined length for the puncturing patterns is fourteen or more bits, and may be twenty or more bits. In some embodiments it is thirty bits—i.e. giving a code rate of 15/m, for a predetermined integer m>15.

The base 1/n convolutional code may use any code rate, but, in some embodiments, it is a 1/2 convolutional code, and the first and second generator polynomials are the only generator polynomials for the convolutions code.

The predetermined code rate may have any value, but in some embodiments the code rate is (n−1)/n for an integer n>3. Thus the convolutional code may have the highest possible code rate for a given length of puncturing pattern, which may be desirable for some communication applications.

The base 1/n convolutional code may have any predetermined constraint length. In some embodiments, it has a constraint length of six.

The 1/n convolutional code may be systematic, but, in some embodiments, it is non-systematic.

In some embodiments, the first generator polynomial may exactly have one more non-zero coefficient than the second generator polynomial.

In some embodiments, the second generator polynomial is $75_8$ (i.e. $111101_2$, so having five non-zero coefficients) and the first generator polynomial is $53_8$ (i.e. $101011_2$, so having four non-zero coefficients). In some such embodiments, n=2, and the 1/2 convolutional code is a [53 75] convolutional code.

Note that the terms "first" and "second" generator polynomial are used herein merely as convenient labels, and not to indicate which generator polynomial's output is used first when applying the 1/n convolutional code.

The simulation of transmission over a noisy channel may be performed in any appropriate way. It may be simulated using software executing on a computer.

The method may comprise, for each candidate puncturing pattern, simulating the transmission of a plurality of data packets over a noisy channel, each data packet comprising data encoded using the 1/n convolutional code punctured in accordance with the respective candidate puncturing pattern.

The determined transmission error rate may be a bit error rate. However, in some embodiments, the determined transmission error rate is a packet error rate.

Although the exclusion condition described above provides a significant efficiency saving, some embodiments may further restrict what patterns are included in the plurality of candidate puncturing patterns.

Thus, in some embodiments, the plurality of candidate puncturing patterns may include only candidate puncturing patterns that puncture strictly fewer coded bits generated by the second generator polynomial than they puncture coded bits generated by the first generator polynomial (i.e. excluding those that puncture the same number of bits from each).

In some embodiments, the plurality of candidate puncturing patterns may include only candidate puncturing patterns that puncture fewer than a threshold number of successive bits output by the 1/n convolutional code. This threshold may depend on a burst-error recovery property of the particular 1/n convolutional code.

In some embodiments, the plurality of candidate puncturing patterns may include only candidate puncturing patterns that puncture fewer than a first threshold number of bits from the first generator polynomial and/or fewer than a second threshold number of bits from the second generator polynomial.

In some embodiments, a plurality of candidate puncturing patterns may be identified that have an equal lowest transmission error rate over all the plurality of candidate puncturing patterns.

The method may be computer-implemented and may be performed by software executing on one or more processors of a computer system. The identified candidate puncturing pattern or patterns may be stored in a memory of the computer system. It may be output from the computer system, e.g. over a network connection, or being displayed on a screen or other display device.

From a further aspect, the invention provides a computer system configured (e.g. by software and/or hardware) to carry out a method as disclosed herein.

From a further aspect, the invention provides computer software (and a transitory or non-transitory computer-readable medium bearing the same) comprising instructions that, when executed by a computer system, cause the computer system to carry out a method as disclosed herein.

The identified candidate puncturing pattern may be used for encoding and/or decoding data in a communication apparatus.

From a further aspect, the invention provides a communication apparatus configured to convolutionally encode data using a punctured convolutional code, or configured to decode data that is convolutionally encoded with a punctured convolutional code, wherein the punctured convolutional code is derived from a 1/n convolutional code using a puncturing pattern identified using a method as disclosed herein.

The applicant has discovered certain puncturing patterns that yield surprisingly low transmission error rates for particular types of convolutional codes.

Thus, from another aspect, the invention provides a communication apparatus configured to convolutionally encode data using a punctured convolutional code, or configured to decode data that is convolutionally encoded with a punctured convolutional code, wherein the punctured convolutional code is derived from a 1/2 convolutional code with a generator matrix of [53 75] using a puncturing pattern of 1101_1001_1001_1001_1001_1100_1101_00 or 1101_1001_1001_1001_1100_1100_1101_00 or 1101_1010_1001_0101_1010_0101_0110_01 to give a code rate of 15/16.

From a further aspect, the invention provides a communication apparatus configured to convolutionally encode data using a punctured convolutional code, or configured to decode data that is convolutionally encoded with a punctured convolutional code, wherein the punctured convolutional code is derived from a 1/2 convolutional code with a generator matrix of [53 75] using a puncturing pattern of 1101_1011_0011_00 to give a code rate of 7/8.

In these patterns, a 0 bit indicates where a bit is punctured (i.e. removed) from a bit stream output by the 1/2 convolutional code.

Any features disclosed herein with reference to the method may be features of these apparatus aspects also.

The communication apparatus may be a radio apparatus. It may comprise a radio transceiver, or a radio transmitter or a radio receiver. The apparatus may be configured to transmit the encoded data, e.g. by radio. It may comprise a convolutional encoder for encoding the data. This may be implemented in hardware (i.e. as application-specific digital logic circuitry) or in software (i.e. by software stored in a memory of the apparatus for execution by a processor of the apparatus), or a combination of hardware and software. The apparatus may additionally or alternatively be configured to receive, e.g. by radio, data that is convolutionally encoded with the punctured convolutional code. It may comprise a convolutional decoder for decoding the encoded data. This may be implemented in hardware or in software or using a combination of hardware and software. It may comprise a Viterbi decoder.

The communication apparatus may be a Bluetooth™ Low Energy radio apparatus—i.e. it may support a current or future version of the Bluetooth™ Low Energy (BLE) specification. The data may be communicated in a data packet which may be a BLE data packet. The apparatus may be configured to transmit or receive the data using a BLE High Data Throughput (HDT) mode.

The communication apparatus may be an electrical device, such as a wireless sensor, audio appliance, laptop computer, etc., or it may be a component for use within a more complex device. In some embodiments it is an integrated circuit, such as a system-on-chip (SoC) or a radio-on-a-chip. It may include an antenna or may comprise an interface for connection to an external antenna. It may comprise interfaces for connection to other external components that may be required for the device to operate, such as a power supply, or a power amplifier, or a crystal oscillator, etc.

Features of any aspect or embodiment described herein may wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the invention will now be described, by way of example only, with reference to the accompanying drawings, in which.

DETAILED DESCRIPTION

Figure 1:
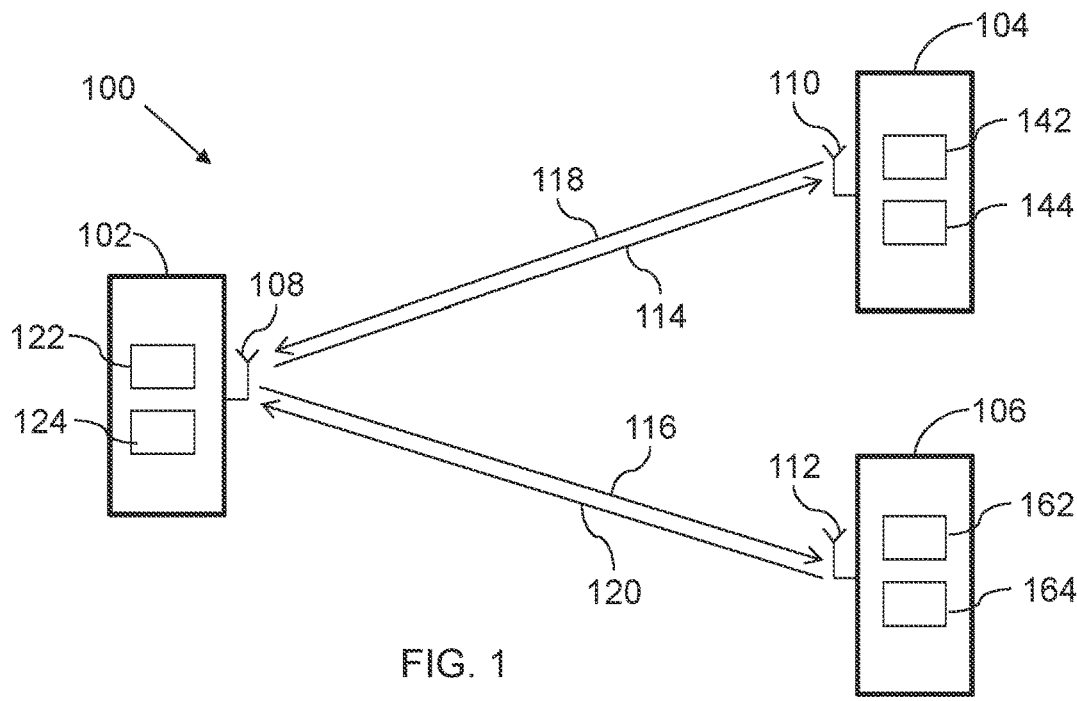
FIG. 1 is a schematic diagram illustrating a system comprising communication apparatus embodying the invention.

FIG. 1 shows a radio system 100 comprising a central radio transceiver device 102, a first peripheral radio transceiver device 104 and a second peripheral radio transceiver device 106. The central device 102 comprises an antenna 108; the first peripheral 104 comprises an antenna 110; and the second peripheral 106 comprises an antenna 112. Standard modules such as power supplies (e.g. batteries), processors, oscillators, filters, amplifiers, digital to analogue converters (DACs) and analogue to digital converters (ADCs) are provided in the radio transceivers 102, 104 and 106, but the description of these is omitted for the sake of brevity.

FIG. 1 also shows signal paths 114, 116, 118, and 120 between the devices 102, 104, 106. Signal paths 114 and 116 are from the central device 102, acting as a transmitter through its antenna 108, to the peripherals 104 and 106 respectively, acting as receivers through their respective antennas 110 and 112. Signal paths 118 and 120 are from the peripherals 104 and 106 respectively, acting as transmitters through their respective antennas 110 and 112, to the central device 102, acting as a receiver through its antenna 108.

In some embodiments, the transceivers 102, 104 and 106 are configured to support a predetermined communication protocol, which may be a current or future version of the Bluetooth Low Energy (BLE) protocol. It will be appreciated, however, that the principles disclosed herein are applicable to a wide range of radio and non-radio communication protocols, e.g. Wi-Fi, Zigbee, etc.

Each of the transceivers 102, 104 and 106 contains a convolutional encoder 122, 142, 162 and a convolutional decoder (e.g. a Viterbi decoder) 124, 144, 164 which it uses to convolutionally encode message data for transmission by radio and to convolutionally decode encoded data received by radio. These may be implemented by hardware or by software or by a combination of both. The encoded data may be contained within radio packets, which may be BLE packets, such as BLE High Data Throughput (HDT) packets.

Each convolutional encoder 122, 142, 162 contains a base convolutional encoder having a base code rate of 1/2, as well as puncturing logic (implemented in hardware or software) for applying a variety of puncturing patterns to the bit stream output of the base encoder in order to support a variety of effective code rates using puncturing.

Figure 2:
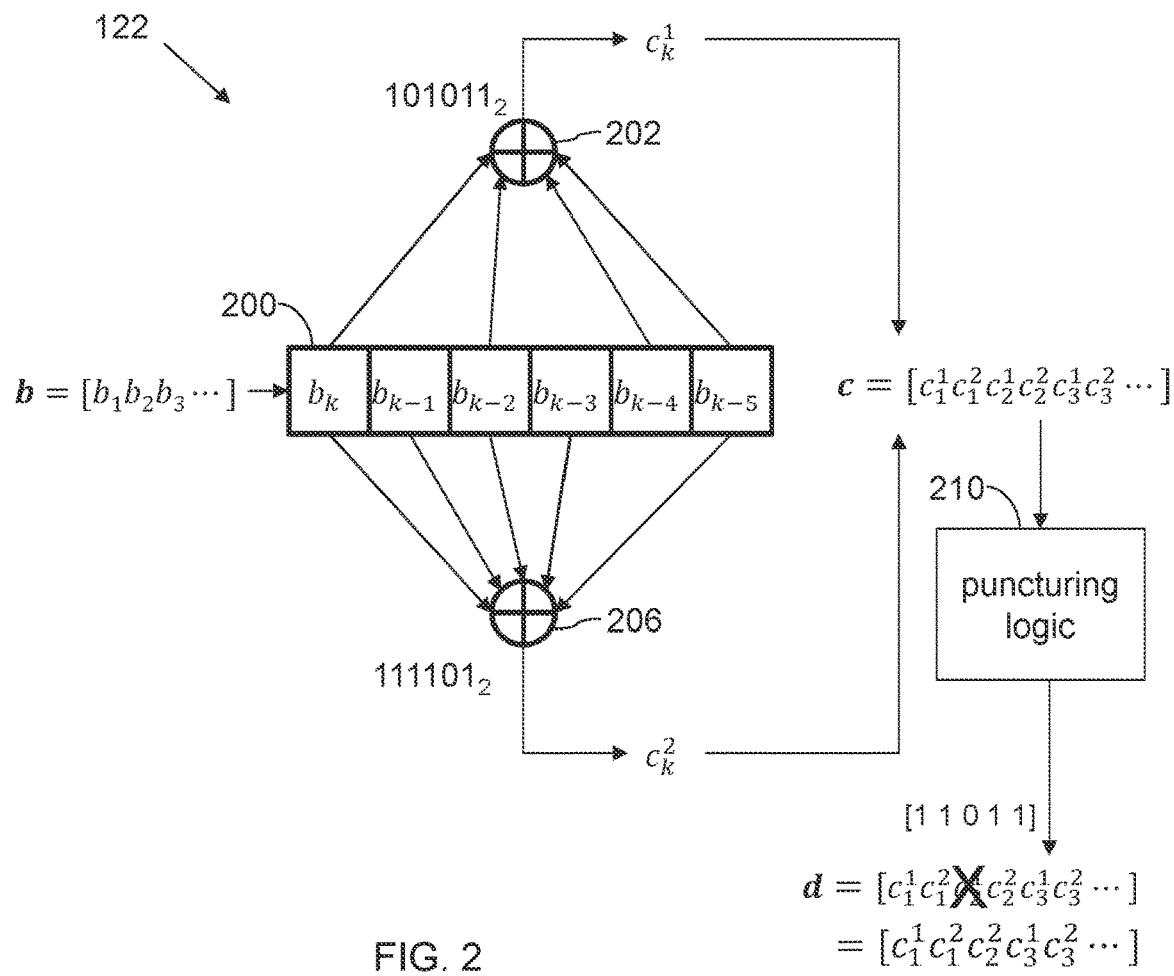
FIG. 2 is a schematic diagram of the implementation of a punctured [53 75] convolutional encoder according to some embodiments.

FIG. 2 shows how the punctured convolutional encoder 122 operates. The other encoders 142, 162 may operate similarly.

The encoder 122 is a [$53_8$ $75_8$] encoder that can support variable output code rates including 7/8 and 15/16. At its core is a 1/2 base convolutional encoder. This can receive a stream b of bits for encoding. These may for example, be output by software executing on a processor of the transceiver 102. The encoder receives the incoming stream into a six-bit shift register 200 which, at each bit shift, provides the four bits $b_k$, $b_{k-2}$, $b_{k-4}$, $b_{k-5}$ to be a first modulo-two adder 202, and the five bits $b_k$, $b_{k-1}$, $b_{k-2}$, $b_{k-3}$, $b_{k-5}$ to be a second modulo-two adder 206. The first adder 202 thus implements the generator polynomial $53_8 = 101011_2$ while the second adder 206 implements the generator polynomial $75_8 = 111101_2$. For each input bit, the first adder 202 produces a summed bit $c_k^1$, while the second adder 202 produces a summed bit $c_k^2$. These bit streams are alternately interleaved to product an intermediate output bitstream c at a rate that is double the input rate.

This intermediate bitstream c is provided to puncturing logic 210 that can apply a configurable puncturing pattern to the bitstream. In the example of FIG. 2, the pattern [1 1 0 1 1] is shown by way of example. This pattern is applied to successive blocks of five bits of the stream to reduce them to four bits by removing (i.e. puncturing) the middle bit. This reduces the code rate by 4/5, thus giving an overall code rate of 1/2÷4/5=5/8.

The length and Hamming weight of the puncturing pattern determines the overall code rate of the encoder 122. Different patterns can be selected by the transceiver 102 depending on what operating mode is being used for the incoming or outgoing radio data.

The transceiver 102 is preconfigured to support puncturing patterns that provide good error-correcting performance. In some embodiments, it is configured to apply a puncturing pattern of 1101_1001_1001_1001_1001_1100_1101_00 and/or 1101_1001_1001_1001_1100_1100_1101_00 to give a code rate of 15/16, and/or to apply a puncturing pattern of 1101_1011_0011_00 to give a code rate of 7/8. In some embodiments, the transceiver 102 may additionally or alternative be configured to apply a puncturing pattern of 1101_1010_1001_0101_1010_0101_0110_01 These patterns may be stored in a memory of the transceiver 102.

These puncturing patterns have been determined to give particularly good performance, as shown by the simulation results below. This is believed in part to be due to the fact that these patterns either puncture the same number of bits from each generator polynomial's output (as in the 7/8 pattern), or puncture more bits from the output of the first adder 202, which depends on only four bits of the incoming message data in its output, rather than the five bits on which the output of the second adder 206 depends. The output of the first adder 202 may thus be seen as containing more information content, and so by puncturing fewer of its bits it may be possible to obtain better error-correcting performance from the punctured bit stream d.

The transceiver 102 may transmit the convolutionally encoded data using any appropriate modulation and transmission rate. For example, in some embodiments, it may use Pi/2-QPSK, 8PSK or 16QAM modulation, and may transmit at a symbol rate of 7 Mbps or 7.5 Mbps. These may correspond to a pre-encoded symbol rate of 2 M symbols per second.

Embodiments of some aspects disclosed herein provide methods for identifying good puncturing patterns, such as these and other patterns, based on this insight. This will now be described with reference to FIG. 3.

Figure 3:
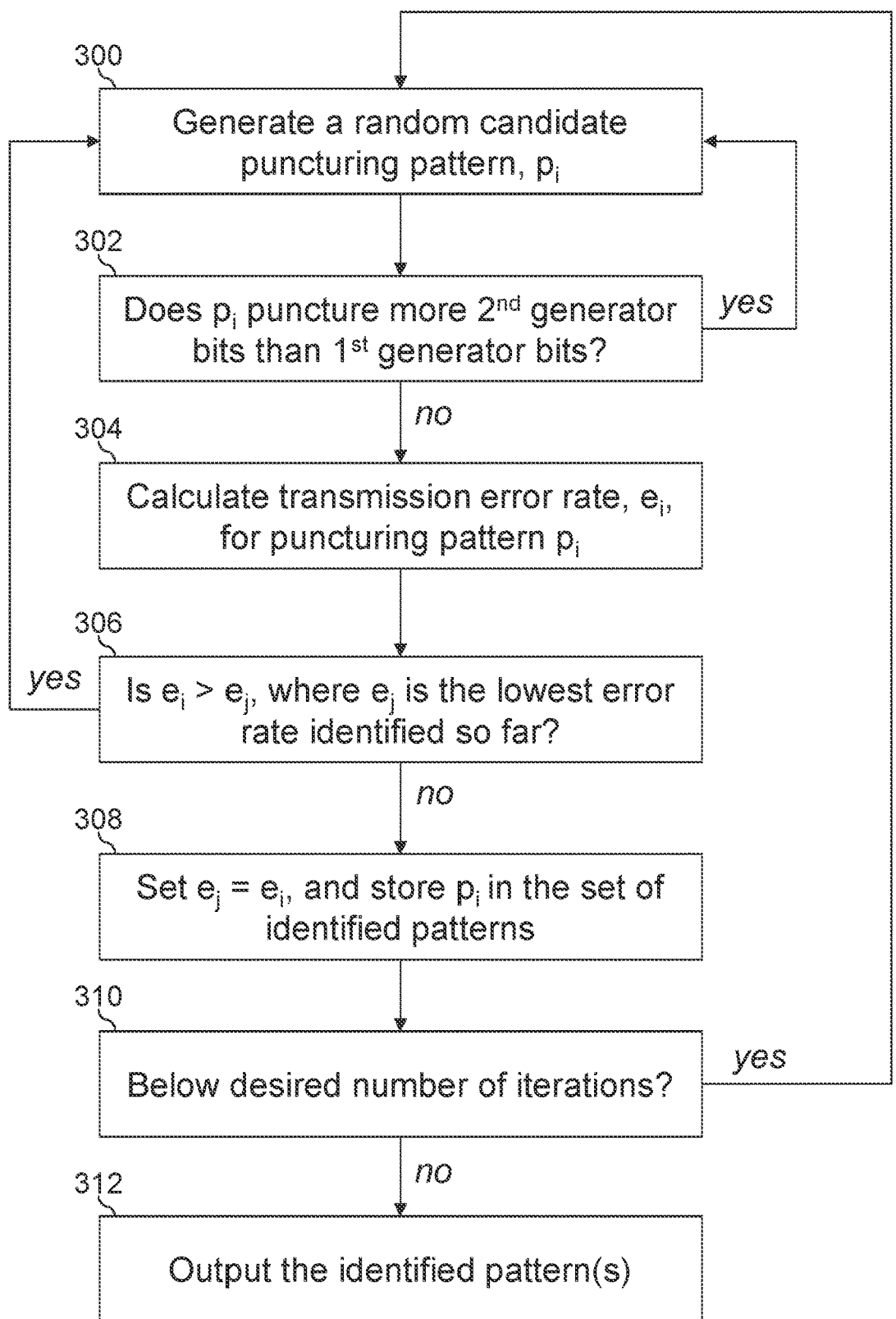
FIG. 3 is a flow chart of steps of a method of generating a puncturing pattern embodying the invention.

FIG. 3 shows an efficient, iterative process for finding one or more good or optimal puncturing patterns that may find an acceptable pattern quicker than a brute-force exhaustive screening approach. It may be repeated for any desired number of iterations.

In a first step 300, a next puncturing pattern, $p_i$, of the desired length (e.g. 30 bits, for a 15/16 code rate) is generated by using a random number generator to produce a random (or pseudo-random) 30-bit string. Next 302, the Hamming weight of its even-indexed bits is compared with the Hamming weight of its odd-indexed bits, to see if it punctures more bits of the second generator polynomial, where the second generator polynomial is the polynomial that depends on more bits than the other polynomial (i.e. it if punctures more of the bits output by the second adder 206, in the example of FIG. 2). If so, it is rejected, and a new candidate is generated 300.

If it does not (i.e. if it punctures the same or fewer bits of the more polynomial that depends on more input bits), then at a next step 304 a simulation is performed to calculate a transmission error rate $e_i$ for the pattern. This may be a packet error rate (PER) and may be calculated by simulating the transmission of a large number of packets including data encoded using the puncturing pattern over a modelled noisy channel—e.g. an additive white gaussian noise (AWGN) channel, with or without multipath fading. The simulation may be performed in accordance with any appropriate simulation approach, such as in accordance with simulation conditions proposed by the Bluetooth™ consortium.

Next 306, the error rate $e_i$ is compared with the lowest error rate $e_j$ identified so far in the process. If it is larger (i.e. worse), then the pattern is rejected. If it is better or equal to the best found so far, then at a next step 308 the best error rate, $e_j$, is updated and the pattern $p_i$ is added to the set of best-performing patterns.

Then 310 the number of iterations performed so far is checked against the desired number of rounds. If they are equal, the process terminates and outputs the set of one or more identified puncturing patterns 312. Otherwise, the process cycles round and generates a next candidate 300.

The process may be implemented in software executing on a computer system, such as workstation or server. The identified patterns may be output to a human operator, who may select one or more to be used by a radio system 100 and/or included in a standard protocol specification.

By applying the simulation only to a subset of the generated candidates, the process can efficiently identify one or more candidates in a realistic time frame, even for long pattern lengths (e.g. 30 bits long or more). In some embodiments, one or more additional filtering conditions may be applied, e.g. between steps 301 and 302, or between 302 and 304, to further reduce the number of simulations that need to be performed in step 304. For example, candidates may be rejected if they have more than a threshold number of zeros (i.e. punctured bit positions) in a row—e.g. if they have more than two or more than three zeros in a row.

In some embodiments, puncturing patterns may be selected for use with a convolutional coder that has a base rate of 1/n for n>2. In such cases, the step 302 may consider any pair of the three or more generator polynomials for which a second polynomial has more non-zero coefficients than a first polynomial. In other embodiments, step 302 may be modified to compared the number of non-zero coefficients in three or more (e.g. all) of the binary generator polynomials, and may discard candidate patterns that puncture predominantly from those polynomials that have more non-zero coefficients.

Figure 4:
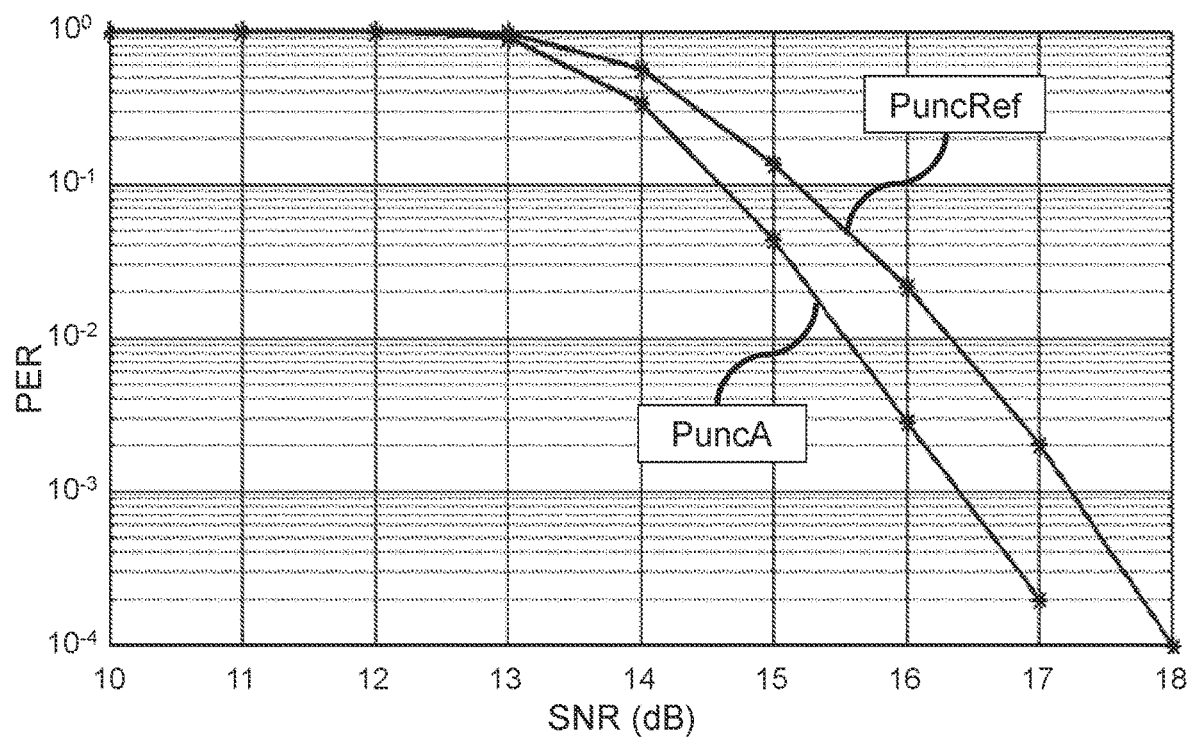
FIG. 4 is a graph of the simulated packet error rate (PER) against signal-to-noise ratio (SNR) for a novel puncturing pattern, used in some embodiments, having a 7/8 code rate, compared with a reference puncturing pattern.
Figure 5:
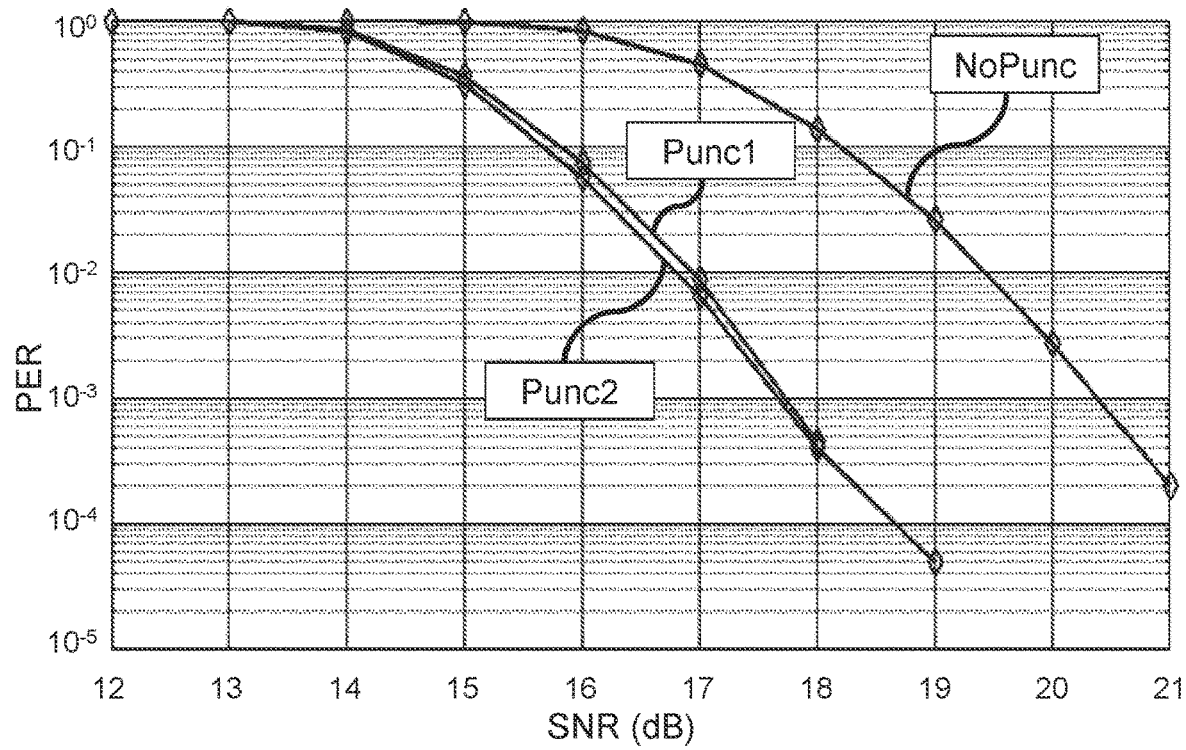
FIG. 5 is a graph of the simulated packet error rate (PER) against signal-to-noise ratio (SNR) for two novel puncturing patterns, used in some embodiments, having a 15/16 code rate, compared with using no puncturing.

FIGS. 4 & 5 demonstrate the desirable performance characteristics of certain exemplary puncturing patterns identified using a process as disclosed herein, when used in simulations of BLE data packets, carrying a 128-byte payload, convolutionally encoded using the puncturing patterns, over a noisy channel.

FIG. 4 shows the packet error rate (PER) when using a puncturing pattern 1101_1011_0011_00 (referred to here as "PuncA"), identified using the novel process, compared with a reference puncturing pattern, 1110_1010_1010_10 ("PuncRef"), that has previously been identified as giving good performance. It can be seen that the PER is lower for PuncA than for the reference pattern across all SNRs.

Since no reference comparator for a 15/16 punctured code rate could be found, FIG. 6 instead shows the PER performance of two novel 15/16 puncturing patterns, 1101_1001_1001_1001_1001_1100_1101_00 ("Punc1") and 1101_1001_1001_1001_1100_1100_1101_00 ("Punc2"), against the case of an unpunctured 16QAM modulated transmission ("NoPunc"). It can be seen that the PER is lower for both novel puncturing patterns than for the unpunctured comparator at all SNRs. There is about 2.6 dB gain at 1% PER.

The 15/16 puncturing pattern 1101_1010_1001_0101_1010_0101_0110_01 has also been found to give improved performance.

Puncturing patterns found using the methods disclosed herein, and used in the communication apparatus disclosed herein, are effective at providing good error-correcting performance.

It will be appreciated by those skilled in the art that the invention has been illustrated by describing one or more specific embodiments thereof, but is not limited to these embodiments; many variations and modifications are possible, within the spirit and scope of the invention.

The invention claimed is:

1. A communication apparatus comprising:
a radio transmitter; and
a convolutional encoder,
wherein the convolutional encoder is configured to convolutionally encode data, for transmission by the radio transmitter, using a punctured convolutional code, wherein the punctured convolutional code is derived from a 1/2 convolutional code with a generator matrix of [53 75] using a puncturing pattern of 1101_1001_1001_1001_1001_1100_1101_00 or
1101_1001_1001_1001_1100_1100_1101_00 or
1101_1010_1001_0101_1010_0101_0110_01 to give a code rate of 15/16, or using a puncturing pattern of 1101_1011_0011_00 to give a code rate of 7/8.

2. The communication apparatus of claim 1, wherein the communication apparatus comprises a Bluetooth™ Low Energy radio.

3. The communication apparatus of claim 2, configured to use the Bluetooth™ Low Energy radio to transmit or receive the data using a High Data Throughput (HDT) mode.

4. The communication apparatus of claim 1, wherein the communication apparatus is a system-on-chip.

5. The communication apparatus of claim 1, configured to use the puncturing pattern of 1101_1001_1001_1001_1001_1100_1101_00.

6. The communication apparatus of claim 1, configured to use the puncturing pattern of 1101_1001_1001_1001_1100_1100_1101_00.

7. The communication apparatus of claim 1, configured to use the puncturing pattern of 1101_1010_1001_0101_1010_0101_0110_01.

8. The communication apparatus of claim 1, configured to use the puncturing pattern of 1101_1011_0011_00.

9. A method of selecting a puncturing pattern of a predetermined length for use with a 1/n convolutional code, for an integer n>1, for encoding data for transmission over a channel using a punctured convolutional code having a predetermined code rate, wherein the 1/n convolutional code uses a predetermined set of binary generator polynomials comprising a first generator polynomial and a second generator polynomial, wherein the second generator polynomial has more non-zero coefficients than the first generator polynomial, the method comprising selecting a puncturing pattern of a plurality of candidate puncturing patterns of the predetermined length by:
   for each candidate puncturing pattern of the plurality of candidate puncturing patterns, simulating transmission of data encoded using the 1/n convolutional code punctured in accordance with the respective candidate puncturing pattern over a noisy channel, and determining a respective transmission error rate for the simulated transmission using the candidate puncturing pattern; and
   comparing the determined transmission error rates for the plurality of candidate puncturing patterns to identify a candidate puncturing pattern that has a lowest transmission error rate of all the plurality of candidate puncturing patterns, wherein the plurality of candidate puncturing patterns includes only candidate puncturing patterns that puncture no more coded bits generated by the second generator polynomial than they puncture coded bits generated by the first generator polynomial.

10. The method of claim 9, wherein the predetermined length for the puncturing patterns is fourteen or more bits.

11. The method of claim 9, wherein the 1/n convolutional code is a 1/2 convolutional code.

12. The method of claim 9, wherein the predetermined code rate is (n−1)/n, for an integer n>3.

13. The method of claim 9, wherein the 1/n convolutional code is non-systematic and has a constraint length of six.

14. The method of claim 9, wherein the second generator polynomial is $75_8$ and the first generator polynomial is $53_8$.

15. The method of claim 9, comprising, for each candidate puncturing pattern, simulating the transmission of a plurality of data packets over a noisy channel, each data packet comprising data encoded using the 1/n convolutional code punctured in accordance with the respective candidate puncturing pattern, and wherein the determined transmission error rate is a packet error rate.

16. The method of claim 9, wherein the plurality of candidate puncturing patterns includes only candidate puncturing patterns that puncture strictly fewer coded bits generated by the second generator polynomial than they puncture coded bits generated by the first generator polynomial.

17. A communication apparatus comprising a convolutional encoder configured to convolutionally encode data using a punctured convolutional code, or comprising a convolutional decoder configured to decode data that is convolutionally encoded with a punctured convolutional code, wherein the punctured convolutional code is derived from a 1/n convolutional code using a puncturing pattern identified using the method of claim 9.

18. The communication apparatus of claim 17, wherein the communication apparatus comprises a Bluetooth™ Low Energy radio transmitter and a convolutional encoder, and is configured to perform the convolutional encoding of data for transmission by the Bluetooth™ Low Energy radio transmitter.

19. A communication apparatus comprising:
   a radio receiver; and
   a convolutional decoder,
wherein the convolutional decoder is configured to decode data, received by the radio receiver, that is convolutionally encoded with a punctured convolutional code, wherein the punctured convolutional code is derived from a 1/2 convolutional code with a generator matrix [53 75] using a puncturing pattern of
1101_1001_1001_1001_1001_1100_1101_00 or
1101_1001_1001_1001_1100_1100_1101_00 or
1101_1010_1001_0101_1010_0101_0110_01 to give a code rate of 15/16, or using a puncturing pattern of 1101_1011_0011_00 to give a code rate of 7/8.

* * * * *